United States Patent
Park et al.

(10) Patent No.: US 9,781,769 B2
(45) Date of Patent: Oct. 3, 2017

(54) METHOD AND APPARATUS FOR CONTROLLING WIRELESS NETWORK CONNECTION

(71) Applicant: Samsung Electronics Co., Ltd., Suwon-si, Gyeonggi-do (KR)

(72) Inventors: Donghoo Park, Seoul (KR); Jayoung Gu, Yongin-si (KR); Jongman Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 104 days.

(21) Appl. No.: 14/671,503

(22) Filed: Mar. 27, 2015

(65) Prior Publication Data

US 2015/0296562 A1   Oct. 15, 2015

(30) Foreign Application Priority Data

Apr. 14, 2014   (KR) ........................ 10-2014-0044324

(51) Int. Cl.
*H04W 76/06* (2009.01)
*H04W 52/02* (2009.01)

(52) U.S. Cl.
CPC ..... *H04W 76/064* (2013.01); *H04W 52/0245* (2013.01); *Y02B 60/50* (2013.01)

(58) Field of Classification Search
CPC ..................... H04W 52/0245; H04W 76/064
USPC ....................................................... 370/252
See application file for complete search history.

(56) References Cited

U.S. PATENT DOCUMENTS

| | | | |
|---|---|---|---|
| 6,744,748 B1 * | 6/2004 | Boulton | H04L 1/20 370/333 |
| 8,076,346 B2 | 12/2011 | Gutman et al. | |
| 9,112,645 B2 * | 8/2015 | Hassan | H04L 1/002 |
| 2004/0165575 A1 * | 8/2004 | Yang | H04L 1/0002 370/349 |
| 2004/0218630 A1 * | 11/2004 | An | H04L 47/10 370/470 |
| 2008/0144500 A1 * | 6/2008 | Chen | H04W 74/0816 370/235 |
| 2011/0280198 A1 | 11/2011 | Kim et al. | |
| 2012/0178438 A1 * | 7/2012 | Vashi | H04W 24/10 455/424 |
| 2014/0169195 A1 * | 6/2014 | Hsin | H04W 72/085 370/252 |

(Continued)

FOREIGN PATENT DOCUMENTS

| | | |
|---|---|---|
| KR | 10-2006-0114745 A | 11/2006 |
| KR | 10-2008-0078365 A | 8/2008 |

(Continued)

*Primary Examiner* — Faruk Hamza
*Assistant Examiner* — Saad A Waqas
(74) *Attorney, Agent, or Firm* — Jefferson IP Law, LLP

(57) ABSTRACT

A method and an apparatus for controlling a wireless network connection are provided. The method includes detecting a signal strength in a connected wireless network, determining whether the detected signal strength is greater than a first threshold, if the detected signal strength is not greater than the first threshold determining whether an error occurs at least once in data transmission through the connected wireless network, and controlling a connection state of the connected wireless network according to a result of the error determination.

11 Claims, 3 Drawing Sheets

(56) References Cited

U.S. PATENT DOCUMENTS

2014/0269269 A1* 9/2014 Kovvali ............... H04W 24/08
370/229

FOREIGN PATENT DOCUMENTS

| KR | 10-2011-0124508 A | 11/2011 |
| KR | 10-1171498 B1 | 7/2012 |
| KR | 10-2012-0130256 A | 11/2012 |

* cited by examiner

METHOD AND APPARATUS FOR CONTROLLING WIRELESS NETWORK CONNECTION

CROSS-REFERENCE TO RELATED APPLICATION(S)

This application claims the benefit under 35 U.S.C. §119 (a) of a Korean patent application filed on Apr. 14, 2014 in the Korean Intellectual Property Office and assigned Serial number 10-2014-0044324, the entire disclosure of which is hereby incorporated by reference. Specification

TECHNICAL FIELD

The present disclosure relates to a method for controlling a wireless network connection according to the strength of a signal, and an apparatus for implementing the method.

BACKGROUND

At present, portable terminals have become necessities of modern life. The portable terminal has a mobile communication function, and thus can receive various pieces of information and various services through a wireless network connection.

Accordingly, it has become a question whether a wireless network connection can be stably controlled so that a user may execute various functions using the portable terminal. For example, when the strength of a signal in a connected wireless network is weak, a bandwidth is reduced which enables data to be transmitted through the relevant network connection, and thus the data transmission may fail in many cases. Although an error occurs in the data transmission, a network configuration is made to attempt to retransmit data in order to continuously transmit the data.

The above information is presented as background information only to assist with an understanding of the present disclosure. No determination has been made, and no assertion is made, as to whether any of the above might be applicable as prior art with regard to the present disclosure.

SUMMARY

An electronic device capable of connecting to a wireless network, including a portable terminal, has a high probability that data will not be transmitted when the strength of a signal in the wireless network is weak. Nevertheless, the electronic device maintains the connection to the wireless network, and thus is problematic in that electric power consumption of the electronic device is large.

Aspects of the present disclosure are to address at least the above-mentioned problems and/or disadvantages and to provide at least the advantages described below. Accordingly, an aspect of the present disclosure is to provide a method for controlling a wireless network connection according to the strength of a signal, and an apparatus for implementing the method.

In accordance with an aspect of the present disclosure, a method for controlling a wireless network connection is provided. The method includes detecting a signal strength in a connected wireless network, determining whether the detected signal strength is greater than a first threshold, if the detected signal strength is not greater than the first threshold determining whether an error occurs at least once in data transmission through the connected wireless network, and controlling a connection state of the connected wireless network according to a result of the error determination.

In accordance with another aspect of the present disclosure, a wireless network apparatus is provided. The apparatus includes a wireless communication unit and a control unit. The control unit detects a signal strength in a wireless network connected by the wireless communication unit, determines whether the detected signal strength is greater than a first threshold, and controls a connection state of the connected wireless network when an error occurs at least once in data transmission through the connected wireless network.

According to various embodiments of the present disclosure, when the strength of a signal in the wireless network is very weak, electric power consumption can be reduced which is caused by unnecessarily maintaining the network connection, attempting to transmit data, and the like.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be noted that the technical terms in the specification are merely used for describing a specific embodiment but do not limit the scope of the present disclosure. Further, the technical terms in the specification should be construed as a meaning generally understood by those skilled in the art unless the terms are defined as another meaning and should not be construed as an excessively inclusive meaning or an excessively exclusive meaning.

As used herein, the terms such as "comprise" or "include" should not be construed as necessarily including all of the various component or operations described in the specification.

Hereinafter, those skilled in the art will fully understand that that the term "data transmission" disclosed in the detailed description comprehensively refers to the transmission and reception of data.

Figure 1:
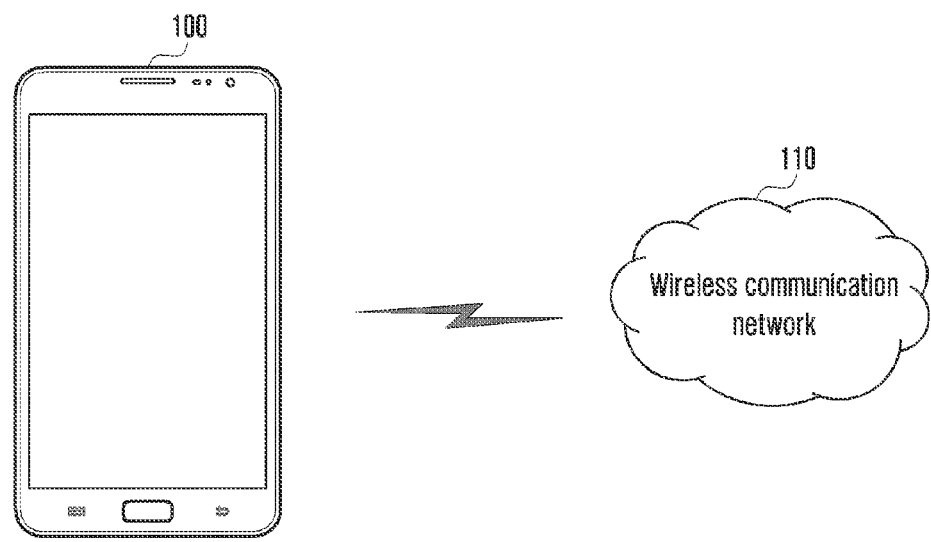
FIG. 1 is a view schematically illustrating a configuration of a data transmission system including an electronic device according to an embodiment of the present disclosure.

FIG. 1 is a view schematically illustrating a configuration of a data transmission system including an electronic device according to an embodiment of the present disclosure.

Referring to FIG. 1, the data transmission system, according to an embodiment of the present disclosure, includes the electronic device 100 that supports a mobile communication function as in the case of a portable terminal, and a wireless communication network 110 that forms a wireless communication channel with the electronic device 100. Hereinafter, a case in which the wireless communication channel is formed between the electronic device 100 and the wireless communication network 110 will be regarded as a case in which the electronic device 100 makes a wireless network connection.

The electronic device 100 forms a wireless communication channel according to the type and characteristic of the wireless communication network 110. The wireless communication channel may be an Internet Protocol (IP)-based communication channel. The electronic device 100, according to an embodiment of the present disclosure, may change a data transmission environment thereof by adjusting the size of a reception buffer of Transmission Control Protocol (TCP)/User Datagram Protocol (UDP), by managing a network parameter and a network port capable of being managed such as the adjustment of a maximum value and a default value of a reception queue of a socket, and the like, and/or by adjusting a data transmission unit such as Maximum Transmission Unit (MTU).

Although not illustrated, the wireless communication network 110 may include, for example, a base station, a base station controller, a switchboard, and the like.

The base station forms a wireless communication channel with the electronic device 100 and processes transmission and reception of data and the like. The base station may perform processing of a baseband signal, wired/wireless conversion, transmission and reception of wireless signals, and the like, and may serve as a terminal device of the network that is directly connected to the electronic device 100.

The base station controller is located between the base station and the switchboard, and manages or controls the base station. The base station controller may perform a function of allocating a wireless channel to the electronic device 100 and cancelling the allocation of the wireless channel thereto, a function of controlling a transmission output between the electronic device 100 and the base station, a function for operating the base station or maintenance thereof, and the like.

The switchboard may be connected to the base station controller and may form a network of wireless communication services.

Figure 2:
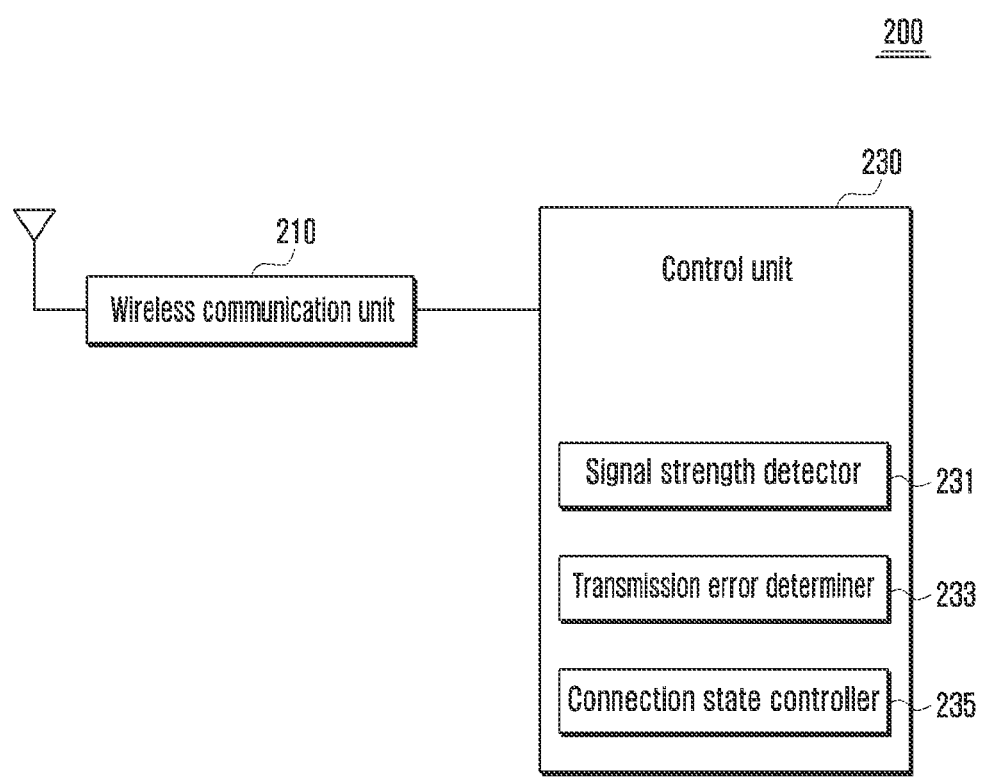
FIG. 2 is a block diagram schematically illustrating a configuration of a wireless network apparatus included in an electronic device according to an embodiment of the present disclosure.

FIG. 2 is a block diagram schematically illustrating a configuration of a wireless network apparatus 200 included in the electronic device 100 according to an embodiment of the present disclosure.

Referring to FIG. 2, the wireless network apparatus 200 may include a wireless communication unit 210 and a control unit 230.

The wireless communication unit 210 may form a wireless communication channel with the wireless communication network. The wireless communication channel may be formed according to various communication types. Multiple pieces of information generated by the wireless communication unit 210 can all be accessed by the control unit 230.

The control unit 230 may identify and control an overall operation of the wireless network apparatus 200. For example, the control unit 230 may include a signal strength detector 231, a transmission error determiner 233, and a connection state controller 235.

The signal strength detector 231 may detect the strength of a signal received by the wireless communication unit 210. The strength of a signal may be detected in such a manner as to measure the strength of a signal and compare the measured signal strength with a threshold. For example, a first threshold may be set in view of whether the strength of a signal is weak enough to cause an error to the transmission of data having a relatively large size. Also, a second threshold may be set in view of whether the strength of a signal is too weak to transmit data. The signal strength detector 231 may detect whether the strength of a signal is greater than or equal to the first threshold, whether the strength of a signal is in a first range between the first threshold and the second threshold, or whether the strength of a signal is in a second range less than the second threshold. For example, the signal strength detector 231 may periodically measure a Received Signal Strength Indicator (RSSI), and may compare the measured RSSI with the threshold.

The transmission error determiner 233 may determine whether an error has occurred in data transmission through the formed wireless communication channel. The transmission error determiner 233 may be activated when the signal strength detected by the signal strength detector 231 is less than the threshold (e.g., the first threshold). The transmission error determiner 233 may detect a case in which data received by the wireless communication unit 210 is imperfect, or a case in which data transmission is not successfully performed. For example, the transmission error determiner 233 may detect that a transmission error has occurred, when an error is detected for a time period, which is set in the electronic device, during data transmission. The time period may be longer than or equal to a timeout which is set by a Domain Name Server (DNS).

When the occurrence of the data transmission error has been detected, the transmission error determiner 233 may output a warning message, which notifies a user of the occurrence of the data transmission error, to the user.

The connection state controller 235 may serve to control a network connection environment (i.e., a data transmission environment) by using a result of the detection and a result of the determination provided by the signal strength detector 231 and the transmission error determiner 233.

When the signal strength is greater than or equal to the first threshold, the connection state controller 235 maintains the wireless network connection. Specifically, the connection state controller 235 may maintain the data transmission environment for data transmission through the existing wireless communication channel.

In contrast, when the signal strength is less than the threshold, the connection state controller 235 may change the current data transmission environment.

When the signal strength is in the first range which is less than the first threshold and is greater than the second threshold, the connection state controller 235 may set a limit to the data transmission environment. For example, the connection state controller 235 may reduce a unit of data transmission (e.g., an MTU). The connection state controller 235 may implement the reduction of the unit of data transmission in such a manner as to reduce a data size of a packet through adjusting the maximum data transmission unit. When the data size of a packet is reduced, data transmission in a weak electric field environment may be improved compared with a case in which a data size is large. Meanwhile, when, as in the case of a streaming service, it is difficult to effectively transmit data when a unit of data transmission is reduced, the connection state controller 235 may block the transmission of the relevant data. For example, the connection state controller 235 may block the established transmission of the data by using data connection information including an attribute of the relevant data.

Also, the connection state controller 235 may reduce a window size in an example of limiting the data transmission environment. When the window size is reduced, the number of packets is reduced which can be transmitted at one time without a response, and thus the amount of the transmitted data is reduced.

Further, in another example of limiting the data transmission environment, the connection state controller 235 may reduce the number of times of data retransmissions corresponding to a data transmission error. In the data transmission environment, the number of times is set by which data transmission is reattempted when an error occurs in the data transmission, and the connection state controller 235 may reduce the number of times according to the detected signal strength.

In still another example of limiting the data transmission environment, the connection state controller 235 may reduce the size of a transmission/reception buffer for storing transmitted/received data. The connection state controller 235 may improve the data transmission environment in such a manner as to reduce the amount of data in a range where it is determined that the strength of a signal is weak but data can be transmitted.

In an embodiment of the present disclosure, the connection state controller 235 may set a limit to the data transmission environment by performing at least one of reduction of the size of the transmission/reception buffer for storing transmitted/received data, reduction of the window size for data transmission, reduction of the number of times of data retransmissions corresponding to a data transmission error, and reduction of the unit of data transmission (e.g., the MTU). The data transmission environment may be improved by various methods in addition to the examples described above.

Thereafter, when the strength of a signal returns to a normal range, the connection state controller 235 may restore the value of the limit, which has been set to the data transmission environment, to the original value.

Meanwhile, the wireless network connection may be concluded when the signal strength is in the second range less than the second threshold, namely, when it is determined that it is difficult to transmit data through the wireless network. Specifically, the connection to the formed wireless communication channel may be disconnected. Since it is meaningless to maintain the wireless network connection and attempt data transmission through the connected wireless network, the wireless network connection is concluded in order to reduce electric power consumed by this operation.

Thereafter, when the strength of a signal returns to the normal range or a value greater than or equal to the first threshold, the connection state controller 235 may restore the wireless network connection which has been concluded.

Figure 3:
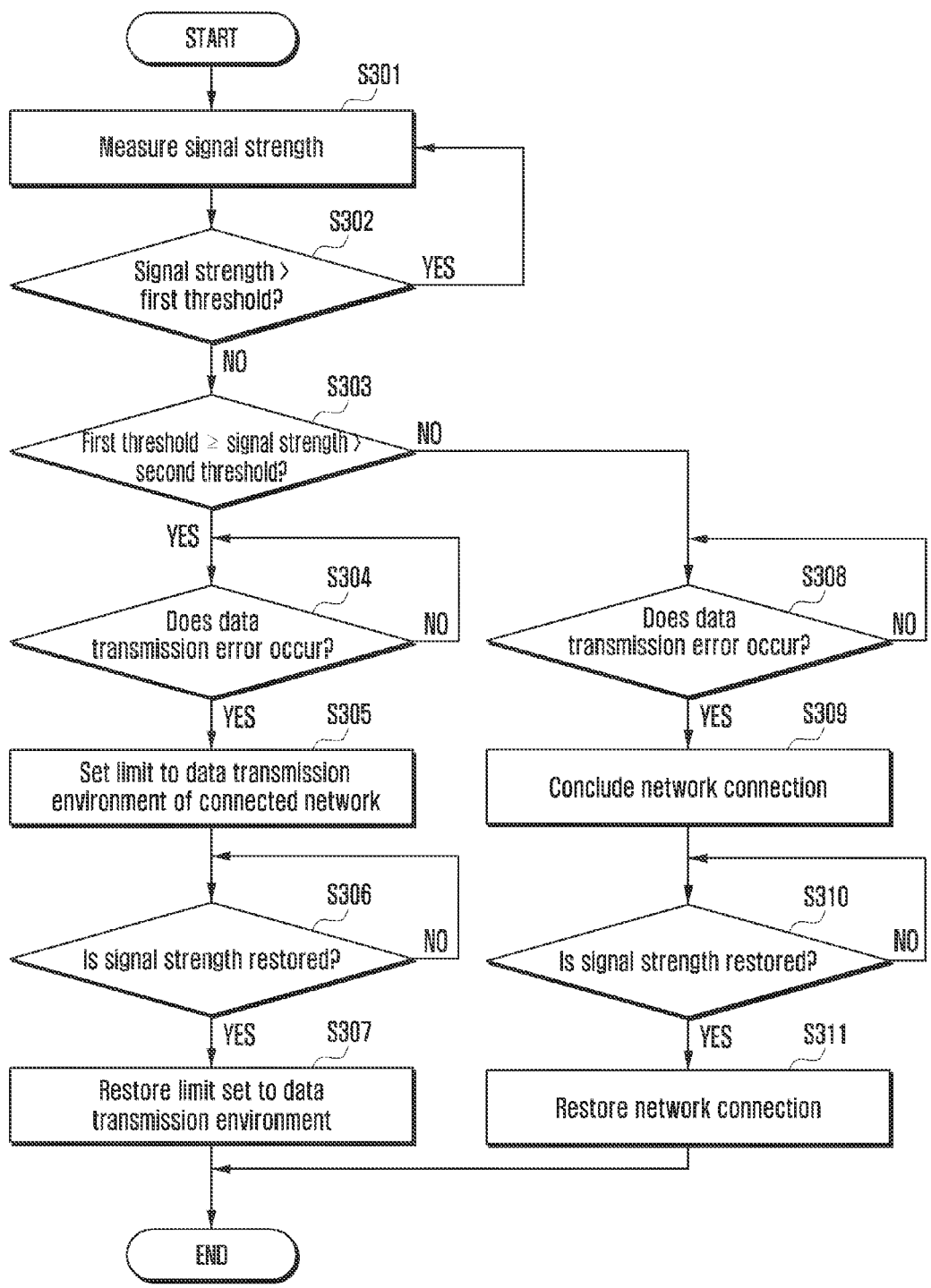
FIG. 3 is a flowchart schematically illustrating a method for controlling a wireless network connection according to an embodiment of the present disclosure.

FIG. 3 is a flowchart schematically illustrating a method for controlling a wireless network connection by the electronic device according to an embodiment of the present disclosure.

First, in operation S301, the electronic device may measure a signal strength in a connected wireless network. A signal strength may be periodically measured. In operations S302 and S303, the electronic device may detect a relevant range including the measured signal strength. For example, in operation S302, the electronic device may determine whether the measured signal strength is greater than or equal to the first threshold. When the measured signal strength is greater than the first threshold, the electronic device may continuously measure the signal strength in the wireless network. When it is determined that the measured signal strength is less than or equal to the first threshold, in operation S303, the electronic device may determine whether the measured signal strength is greater than the second threshold.

When the measured signal strength is in the first range which is less than or equal to the first threshold and is greater than the second threshold, in operation S304, the electronic device may detect whether an error has occurred in data transmission. For example, when an error is detected for a time period which is set in the electronic device, the electronic device may detect that the error has occurred in the data transmission. The set time period may be longer than or equal to a DNS timeout. When the measured signal strength is in the first range, it is not impossible to perform data transmission. Accordingly, in operation S305, the electronic device may set a limit to a data transmission environment of the connected wireless network while maintaining the existing network connection. Specific contents related to the limit, which is set to the data transmission environment, are as described with reference to FIG. 2.

In operation S306, the electronic device may determine whether the measured signal strength is restored to the normal range, namely, a value greater than the first threshold. When the measured signal strength is restored to the normal range, in operation S307, the electronic device may restore the limit which has previously been set to the data transmission environment.

Meanwhile, if it is determined in operation S303 that the measured signal strength is in the second range which is less than or equal to the second threshold, in operation S308, the electronic device may detect whether an error occurs in data transmission. When an error is sensed by the predetermined number of times, the electronic device may detect that the error occurs in the data transmission. When the measured signal strength is in the second range, it is not possible to perform data transmission. Accordingly, in operation S309, the electronic device may conclude the existing wireless network connection. Since the wireless network connection is concluded, the electronic device does not perform an operation related to data transmission any longer. Therefore, the electronic device may reduce the corresponding electric power consumption.

In operation 5310, the electronic device may determine whether the measured signal strength is restored to the normal range or a value greater than the second threshold. When the measured signal strength is restored to the normal range or a value greater than the second threshold, in operation 5311, the electronic device may restore the wireless network connection which has previously been concluded.

According to various embodiments, at least a part the device or the method according to the present disclosure may be implemented by instructions stored in a non-transitory computer-readable storage medium in the form of a programming module. When a command is executed by one or more processors (for example, the control unit 230), the one or more processors may execute a function corresponding to the command. The non-transitory computer-readable storage medium may be, for example, a memory including an electronic apparatus. At least some of the programming modules may be implemented (for example, executed) by, for example, the processor. At least some of the programming modules may include, for example, a module, a program, a routine, a set of instructions or a process for performing one or more functions.

The non-transitory computer readable recording medium may include magnetic media such as a hard disc, a floppy disc, and a magnetic tape, optical media such as a compact disc read only memory (CD-ROM) and a digital versatile disc (DVD), magneto-optical media such as a floptical disk, and hardware devices specifically configured to store and execute program commands, such as a ROM, a random access memory (RAM), and a flash memory. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

A module or a programming module according to an embodiment of the present disclosure may include at least one of the described component elements, a few of the component elements may be omitted, or additional component elements may be included. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for controlling a wireless network connection, the method comprising:
    detecting a signal strength in a connected wireless network;
    determining whether an error occurs in data transmission through the connected wireless network; and
    controlling a connection state of the connected wireless network based on the detected signal strength and whether the error occurs,
    wherein the controlling of the connection state comprises:
    setting a limit to a data transmission environment of the connected wireless network when the error occurs and the detected signal strength is less than or equal to a first threshold and greater than a second threshold;
    terminating the wireless network connection when the error occurs and the detected signal strength is less than or equal to the second threshold;
    releasing the limit to the data transmission environment of the connected wireless network and restoring a previous value associated with the data transmission environment when the signal strength is detected to be greater than the first threshold after setting the limit; and
    restoring the wireless network connection when the signal strength is detected to be greater than the second threshold after terminating the wireless network connection, and
    wherein the determining of whether the error occurs in data transmission through the connected wireless network comprises determining, during the data transmission, whether the error occurs for a time period longer than or equal to a set Domain Name Server (DNS) timeout.

2. The method of claim 1, wherein the setting of the limit to the data transmission environment includes at least one of reduction of a size of a transmission/reception buffer for storing data, reduction of a window size for the data transmission, reduction of a number of times of retransmission corresponding to the data transmission error, and reduction of a maximum transmission unit (MTU) comprising a unit of the data transmission.

3. The method of claim 2, wherein the setting of the limit to the data transmission environment comprises blocking data transmission by using data connection information on data when the reduction of the MTU is determined to not be effective for the relevant data.

4. The method of claim 1, wherein it is determined that the error occurs in the data transmission through the connected wireless network when the detected signal strength is less than or equal to the second threshold.

5. The method of claim 4, further comprising providing a notification to a user when the detected signal strength is less than or equal to the first threshold and the error occurs for a predetermined time period or more in the data transmission through the connected wireless network.

6. A wireless network apparatus comprising:
    a wireless communication unit; and a control unit for detecting a signal strength in a wireless network connected by the wireless communication unit, determining whether an error occurs in data transmission through the connected wireless network, setting a limit to a data transmission environment of the connected wireless network when the error occurs and the detected signal strength is less than or equal to a first threshold and greater than a second threshold, terminating the connection to the wireless network when the error occurs and the detected signal strength is less than or equal to the second threshold, releasing the limit to the data transmission environment of the connected wireless network and restoring a previous value associated with the data transmission environment when the signal strength is detected to be greater than the first threshold after setting the limit, and restoring the wireless network connection when the signal strength is detected to be greater than the second threshold after terminating the wireless network connection, wherein the control unit determines, during the data transmission, whether the error occurs for a time period longer than or equal to a set Domain Name Server (DNS) timeout.

7. The wireless network apparatus of claim 6, wherein, as an operation of setting the limit to the data transmission environment, the control unit includes at least one of reduction of a size of a transmission/reception buffer for storing data, reduction of a window size for the data transmission, reduction of a number of times of retransmission corresponding to the data transmission error, and reduction of a maximum transmission unit (MTU) comprising a unit of the data transmission.

8. The wireless network apparatus of claim 7, wherein the control unit blocks data transmission by using data connection information on data when the reduction of the MTU is determined not to be effective for the relevant data.

9. The wireless network apparatus of claim 6, wherein the control unit determines that the error occurs in the data transmission through the connected wireless network when the detected signal strength is less than or equal to the second threshold.

10. The wireless network apparatus of claim 6, wherein the control unit provides a notification to a user when the detected signal strength is less than or equal to the first threshold and the error occurs for a predetermined time period or more in the data transmission through the connected wireless network.

11. A non-transitory computer-readable recording medium including program instructions for performing a wireless network connection control operation comprising:

detecting a signal strength in a connected wireless network;

determining whether an error occurs in data transmission through the connected wireless network; and controlling a connection state of the connected wireless network based on the detected signal strength and whether the error occurs, wherein the controlling of the connection state comprises:

setting a limit to a data transmission environment of the connected wireless network when the error occurs and the detected signal strength is less than or equal to a first threshold and greater than a second threshold;

terminating the wireless network connection when the error occurs and the detected signal strength is less than or equal to the second threshold;

releasing the limit to the data transmission environment of the connected wireless network and restoring a previous value associated with the data transmission environment when the signal strength is detected to be greater than the first threshold after setting the limit; and restoring the wireless network connection when the signal strength is detected to be greater than the second threshold after terminating the wireless network connection, and wherein the determining of whether the error occurs in data transmission through the connected wireless network comprises determining, during the data transmission, whether the error occurs for a time period longer than or equal to a set Domain Name Server (DNS) timeout.

* * * * *